March 21, 1933.    G. DAUX    1,901,900

FLUID PRESSURE REGULATOR

Filed July 24, 1930

INVENTOR.
GASTON DAUX
BY Wm. M. Cady
ATTORNEY.

Patented Mar. 21, 1933

1,901,900

UNITED STATES PATENT OFFICE

GASTON DAUX, OF SEVRAN, FRANCE, ASSIGNOR TO THE WESTINGHOUSE AIR BRAKE COMPANY, OF WILMERDING, PENNSYLVANIA, A CORPORATION OF PENNSYLVANIA

FLUID PRESSURE REGULATOR

Application filed July 24, 1930, Serial No. 470,295, and in France January 10, 1930.

This invention relates to pressure regulators for fluid pressure apparatus and more particularly to regulators adapted to control the operation of an electrically driven fluid compressor so as automatically to maintain a predetermined substantially constant pressure in a reservoir supplied with fluid from the compressor.

The principal object of my invention is to provide an improved form of regulator of the above type which is capable of maintaining the reservoir pressure at the desired value within relatively small limits, the improved regulator being also simple and durable in construction while being readily adjustable and requiring practically no attention in service.

Figure 1:
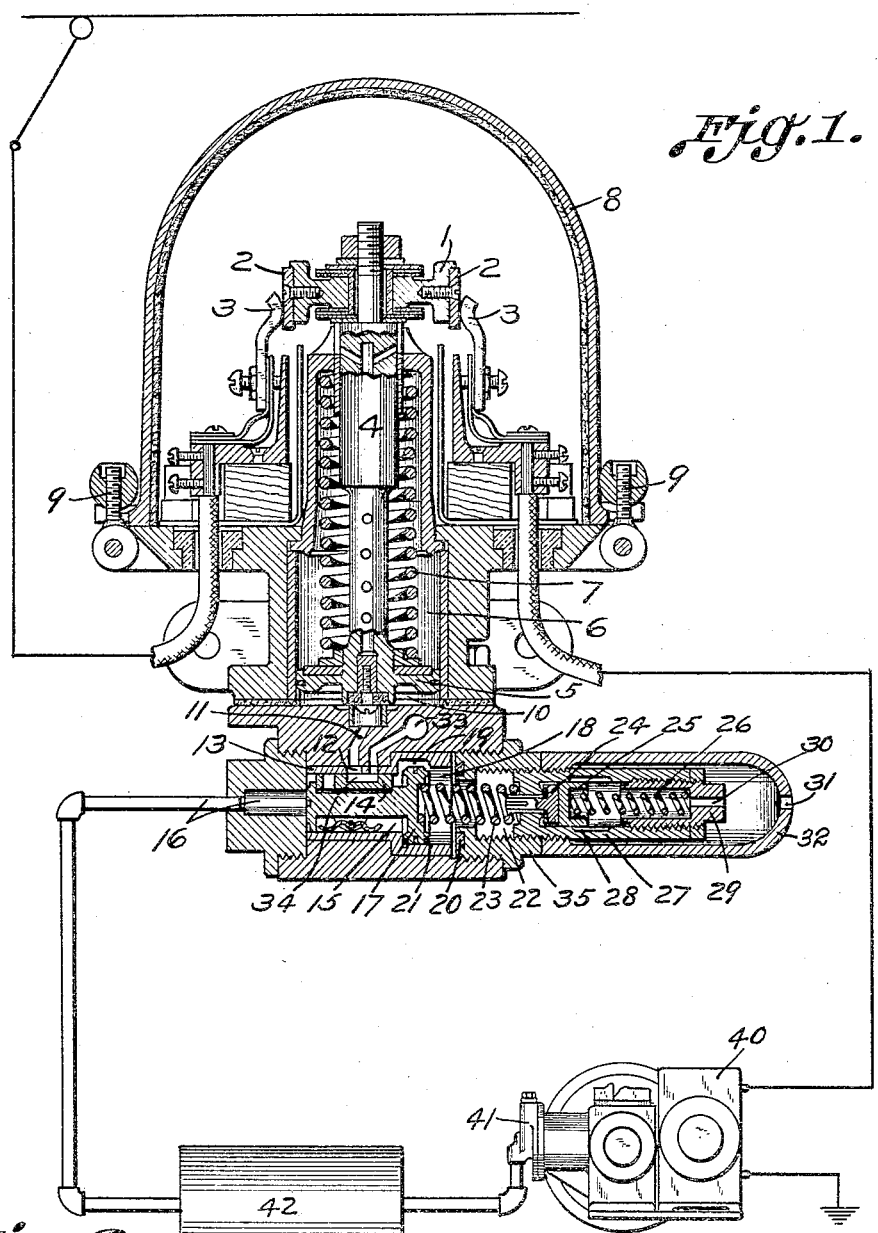
Figure 2:
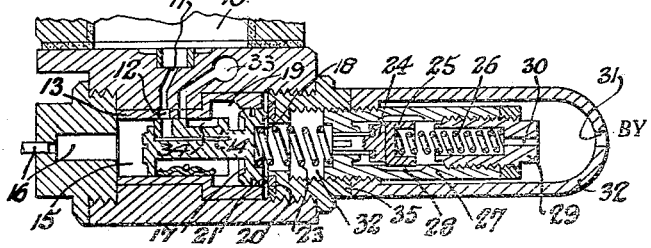

In the accompanying drawing, Fig. 1 is a diagrammatic view, mainly in section, of a fluid pressure apparatus embodying my invention, the several parts of the apparatus being shown in position to effect the operation of the compressor to supply fluid under pressure to the main reservoir, and Fig. 2 is a fragmentary sectional view illustrating the several parts of the apparatus in positions to which they are adapted to be shifted in rendering the compressor inoperative.

Referring now to the drawing, it will be seen that the regulator comprises an upper portion constituting a switch actuated by fluid under pressure and included in the circuit of an electric motor 40 operating a compressor 41 and a lower part constituting the regulating mechanism proper.

The switch comprises a cross-head 1 carrying a pair of contacts 2 adapted to engage with corresponding fixed contacts 3 connected in the motor circuit, the cross-head 1 being mounted upon the upper end of the piston rod 4 of a piston 5 adapted to move within a piston chamber 6. The piston 5 is provided with a controlling spring 7 by means of which the piston is normally maintained in its lower position in the chamber 6 so that the contacts 2 engage with the fixed contacts 3 as shown. The switch portion of the regulator is protected by a detachable cover 8, the internal surface of which is lined with insulating material, the cover being secured in position by means of bolts 9.

The space 10 underneath the piston 5 is arranged to communicate with a passage 11 leading to a port 12 in the valve seat 13 provided in the lower part of the regulator. A slide valve 14 engaging with the valve seat 13 is located in a valve chamber 15 which is in open communication with a reservoir 42 by way of a passage and pipe 16. The slide valve 14 is operated by means of a piston 17 mounted in a piston chamber 18, communication between the chambers 15 and 18 around the piston 17 being effected through a leakage groove 19 so long as the piston is in its normal or left hand position as shown in Fig. 1 of the drawing.

The right hand wall of the chamber 18 is provided with an annular gasket 20 adapted to be engaged by a corresponding annular projection 21 on the piston 17, a central opening in this wall establishing communication between the chamber 18 and a chamber 22 when the piston 17 is in the position illustrated in Fig. 1, in which position it is normally maintained by means of a spring 23.

The chamber 22 is provided with a poppet valve 24 which is normally held on its seat by means of a small piston 25 having a controlling spring 26, the piston 25 being mounted in a casing 27, the inner surface of which is provided with leakage grooves 28.

The left hand end of the casing 27 carries the valve 24 and abuts against the right hand end of the spring 23, and the initial compression of this spring can be adjusted by rotating the casing 27 which is screw-threaded into the bushing 35 containing the chamber 22. The opposite end of the spring 26 to that engaging with the piston 25 abuts against an adjustable plug 29 screw-threaded into the end of the casing 27, the initial compression of the spring 26 being thus capable of adjustment by rotating the plug 29. The interior of the casing 27 is in open communication with the atmosphere through a port 30 in the plug 29 and an opening 31 in an outer casing 32.

The operation of the regulator is as follows:

Assuming that the parts of the device are in the position shown in Fig. 1, it will be seen that the piston 5 is in its lower position, so that the switch contacts 2 are in engagement with the fixed contacts 3, and the supply circuit of the motor 40 driving the compressor 41 is consequently closed. The compressor is therefore being operated to compress fluid into the reservoir.

The fluid pressure obtaining in the reservoir 42 and in the chamber 15 communicating therewith is transmitted through the leakage groove 19 to the chambers 18 and 22, and as soon as this pressure attains a value corresponding to the strength of the spring 26, the valve 24 will be opened as shown in Fig. 2 and the fluid pressure is thereby permitted to act upon the larger area of the piston 25 which is thus moved rapidly towards the right. Fluid under pressure in the chamber 22 will then escape to the atmosphere by way of the open valve 24, the grooves 28 and the port 30 and opening 31.

The chamber 18 having been thus vented, the piston 17 will be moved towards the right by the reservoir pressure in the chamber 15 against the opposing action of the spring 23, and the slide valve 14 will open the port 12, thereby admitting fluid under pressure to the space 10 below the piston 5 through the passage 11. The piston 5 will consequently be moved upwards against the action of the spring 7, and the switch contacts 2 will be moved out of engagement with the fixed contacts 3 so as to interrupt the motor circuit and cause the compressor 41 to stop.

During this upward movement of the piston 5 the air contained in the cylinder 6 above the piston will be expelled through the interior of the hollow piston rod 4, which is provided with apertures for this purpose, this air issuing from the piston rod adjacent to the contacts 3 so as to assist in extinguishing the arc formed at the contacts 2 and 3 as these contacts are separated.

It will be observed from an inspection of Fig. 2 that the annular projection 21 on the piston 17 is, under these conditions, in engagement with the gasket 20, so that communication between the chamber 22 and the chambers 18 and 15 is completely cut off. Now when the pressure of fluid in chamber 22 falls to a value below that corresponding to the strength of the compressed spring 26, said spring acts to move the piston 25 and valve 24 from the position in which they are shown in Fig. 2 to the position in which they are shown in Fig. 1.

If now the pressure in the reservoir 42 falls to a value below that corresponding to the strength of the compressed spring 23, the latter will move the piston 17 towards the left, so that the slide valve 14 establishes communication between the port 12 and an exhaust port 33 through a cavity 34 in the slide valve.

The space 10 below the piston 5 is thus vented to the atmosphere through the port 33, and the piston is consequently moved downwards under the action of the spring 7, thereby reclosing the motor circuit and causing the compressor 41 to be restarted into operation.

It will be understood that the spring 23 determines the reservoir pressure at which the compressor will be started into operation, while the spring 26 determines the reservoir pressure at which the compressor will be stopped, so that by adjusting the initial compression of these springs as above described, the reservoir pressure can be maintained within extremely narrow limits at a substantially constant value.

Moreover, this adjustment of the controlling springs 23 and 26 can be readily effected by simply removing the cover 32 and rotating the casing 27 and the plug 29 respectively.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a motor control, the combination with a pump, of a motor for operating said pump, a device for controlling the operation of said motor, a cylinder, a piston in said cylinder for actuating said device, a spring, valve mechanism subject to pump pressure and the pressure of said spring for admitting fluid under pressure to and for releasing fluid under pressure from said cylinder, a housing operative to adjust the pressure of said spring, a spring in said housing, means in said housing subject to a predetermined pump pressure and the opposing pressure of the last mentioned spring for controlling the operation of said valve mechanism to admit fluid under pressure to said cylinder, and means carried by said housing for adjusting the pressure of the last mentioned spring.

2. In a motor control, the combination with a pump, of a motor for operating said pump, a device for controlling the operation of said motor, a cylinder, a piston in said cylinder for actuating said device, a spring, valve mechanism subject to pump pressure and the pressure of said spring for admitting fluid under pressure to and for releasing fluid under pressure from said cylinder, a housing serving as a seat for one end of said spring and rotatable for adjusting the pressure of the spring, valve means in said housing for controlling the operation of said mechanism to admit fluid under pressure to said cylinder, and means for adjusting said valve means.

3. In a motor control, the combination with a pump, of a motor for operating said pump, a device for controlling the operation of said motor, a cylinder, a piston in said cylinder for actuating said device, a valve operative to one position for admitting fluid under pressure to said cylinder and operative to another position for releasing fluid under pressure from said cylinder, a movable abutment for actuating said valve, said abutment being subject on both sides to pump pressure when said valve is in the position to release fluid under pressure from said cylinder and operative upon the venting of fluid under pressure from one side thereof to shift said valve to admit fluid under pressure to said cylinder, valve means subject to a predetermined pump pressure for venting fluid under pressure from said side of said abutment, and a spring for actuating said piston to shift said valve to release fluid under pressure from said cylinder when the pressure of fluid on the valve side of said abutment reduces to a predetermined degree.

4. In a motor control, the combination with a pump, of a motor for operating said pump, a device for controlling the operation of said motor, a cylinder, a piston in said cylinder for actuating said device, a valve operative to one position for admitting fluid under pressure to said cylinder and operative to another position for releasing fluid under pressure from said cylinder, a movable abutment for actuating said valve, said abutment being subject on both sides to pump pressure when said valve is in the position to release fluid under pressure from said cylinder and operative upon the venting of fluid under pressure from one side thereof to shift said valve to admit fluid under pressure to said cylinder, valve means subject to a predetermined pump pressure for venting fluid under pressure from said side of said abutment, spring means for seating said valve after fluid under pressure is vented from said side of the abutment, and a spring for actuating said piston to shift said valve to release fluid under pressure from said cylinder when the pressure of fluid on the valve side of the abutment reduces to a predetermined degree.

5. In a motor control, the combination with a pump, of a motor for actuating said pump, means for controlling the operation of said motor, a cylinder, a piston in said cylinder for actuating said means, a valve casing, a valve in said casing operative to admit fluid under pressure to said cylinder and operative to release fluid under pressure from said cylinder, a piston in said valve casing for actuating said valve, the last mentioned piston being subject on its inner and outer faces to fluid at pump pressure and operative upon a reduction in pressure on its outer face for actuating said valve to admit fluid under pressure to said cylinder and operative upon a reduction in pressure on its inner face for actuating said valve to release fluid under pressure from said cylinder, vent valve pressure responsive to a predetermined pump means for effecting a reduction in the pressure of fluid on the outer face of said piston, and a spring for shifting said piston to actuate said valve to its position to release fluid under pressure from said cylinder when the pump pressure acting on the inner face of said piston becomes less than the opposing pressure of said spring.

6. In a motor control, the combination with a pump, of a motor for actuating said pump, means for controlling the operation of said motor, a cylinder, a piston in said cylinder for actuating said means, a valve casing, pressure sensitive valve means subject on both sides to fluid at pump pressure and operative upon a reduction in fluid pressure on one side for admitting fluid under pressure to said cylinder, vent valve means responsive to fluid at a predetermined pump pressure for effecting a reduction in the pressure of fluid on said side of said pressure sensitive valve means, and a spring acting on said side of the pressure sensitive valve means for actuating the pressure sensitive valve means to release fluid under pressure from said cylinder upon a predetermined reduction in pump pressure on the other side of said pressure sensitive valve means.

7. In a motor control, the combination with a pump, of a motor for actuating said pump, means for controlling the operation of said motor, a cylinder, a piston in said cylinder for actuating said means, a valve casing, a valve in said casing having a position for admitting fluid under pressure to said cylinder and having another position for releasing fluid under pressure from said cylinder, a spring in said valve casing, a movable abutment in said casing for actuating said valve, said movable abutment being subject on both sides to fluid at pump pressure and on one side to the additional pressure of said spring when said valve is in the position to release fluid under pressure from said cylinder, and vent valve means responsive to fluid at a predetermined high pump pressure for effecting a reduction in the pressure of fluid on the spring side of said abutment, said abutment being operative by fluid at pump pressure on the valve side upon the reduction in fluid pressure on the spring side to shift said valve to the position to admit fluid under pressure to said cylinder.

In testimony whereof, I have hereunto set my hand this 3rd day of July, 1930.

GASTON DAUX.